O. DIEFFENBACH.
DIAPHRAGM FOR ELECTROLYSIS.
APPLICATION FILED JULY 1, 1911.
1,039,266.                                                    Patented Sept. 24, 1912.
Fig. 1.                      Fig. 2.
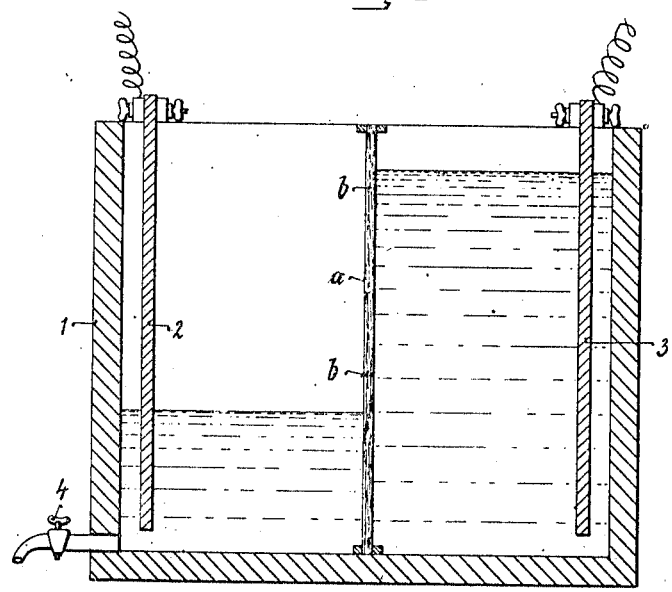
Fig. 3.
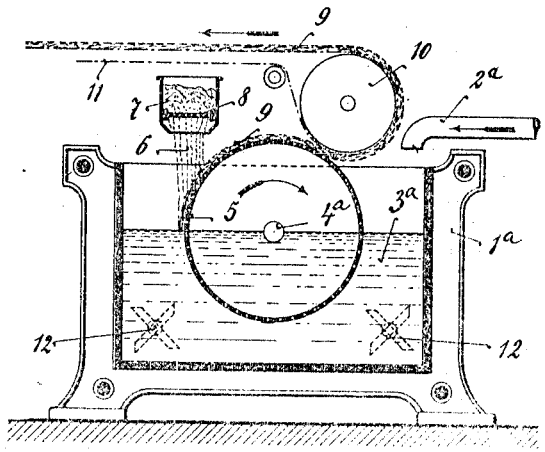
WITNESSES:
G. V. Rasmussen
Louis Alexander
INVENTOR
OTTO DIEFFENBACH
BY
ATTORNEYS

UNITED STATES PATENT OFFICE.

OTTO DIEFFENBACH, OF DARMSTADT, GERMANY.

DIAPHRAGM FOR ELECTROLYSIS.

1,039,266.     Specification of Letters Patent.     Patented Sept. 24, 1912.

Application filed July 1, 1911. Serial No. 636,368.

*To all whom it may concern:*

Be it known that I, OTTO DIEFFENBACH, chemist, a subject of the Grand Duke of Hesse, Germany, residing in Darmstadt, in the Grand Duchy of Hesse, Germany, have invented certain new and useful Improvements in or Relating to Diaphragms for Electrolysis, of which the following is a specification.

The subject-matter of my invention is an improved porous diaphragm for the purpose of electrolysis.

Porous diaphragms are required for use in very different ways for electrolysis, e. g. electrolyzing salt solutions, when the diaphragms are so inserted in the vats that liquid is at both sides of them. During electrolysis the liquid frequently rises considerably higher on the one side than on the other so that there is a very considerable pressure on the diaphragm when the vat is large; to withstand the breaking strain the diaphragm must have considerable strength. For this reason the diaphragms must be made fairly thick because the porous substances of which they consist have *per se* no great strength to withstand breaking strain. By so making them, however, the electrical resistance of the plates is considerably increased causing loss of energy which is quite appreciable when working on a large scale.

A primary object of my invention is to remedy this defect. Accordingly I use as a diaphragm for the purposes of electrolysis a plate of asbestos and cement in which the asbestos fibers are positioned approximately parallel with the plane of the plate. Such plates are obtained, as is known, when cement and asbestos fibers are worked up in suitable proportions on a machine for making paper or pasteboard, or on another machine for operating according to a similar principle, so that the asbestos fibers are placed parallel to one another and form a layer into which the particles of cement are introduced. The parallel arrangement of the asbestos fibers in the direction of the plane of the plate gives such plates great ability to withstand breaking strain so that they can be made very thin and the electrical resistance be consequently reduced. Sufficient porosity can be obtained either by not pressing the plates at all or only slightly while they harden or by adding to them during their manufacture substances, as e. g. mineral salt, which may be washed out later.

In the accompanying drawings Figure 1 is a vertical section through a plate according to my invention, whereas Fig. 2 is a vertical section through a vat showing such a plate used as a diaphragm when electrolyzing a salt solution, and Fig. 3 is a like view of one form of machine which may be used for making my diaphragms.

In Fig. 1, *a* designates the plate composed of cement and having in it asbestos fibers *b* positioned so that they are substantially parallel with the plane of the plate. Such plates, which are made without pressure while they harden, have a very great ability to withstand breaking strain and a small electrical resistance and are consequently very suitable as diaphragms.

Fig. 2 represents the electrolysis of a solution of potassic chlorid (KCl) for obtaining potassium lye (KOH). 1 is the vat which contains the potassic chlorid solution and in which the cement plate *a* (Fig. 1) having asbestos fibers *b* is inserted forming the diaphragm. Potassium is obtained at electrode 2 and chlorin at electrode 3. The potassium forms with the water potassium lye (KOH) and this is drawn off through a stop cock 4 from time to time as soon as it is sufficiently concentrated. A considerable lateral pressure is produced each time on the diaphragm as the compartment containing electrode 3 is always kept filled and therefore the diaphragm must be well able to withstand breaking-strain.

Fig. 3 illustrates a known process by means of which an asbestos-cement plate having asbestos fibers parallel with the plane of the plate can be made, (compare, e. g. British Letters Patent No. 5955 of the year 1906 in the name of Klee). In this figure 1ª is the pulp-vat of an ordinary cylinder pasteboard machine in which the stirrers 12 are arranged. Asbestos 3ª mixed with water is admitted through pipe 2ª. The perforated cylinder 5 on shaft 4ª takes up the asbestos fibers from the vat and places them parallel one with another in the form of a layer 9. The finely divided cement 6 falls from a vessel 7 having a perforated bottom 8 onto this layer and onto the surface of the asbestos mixture in the vat. The particles of cement lodge between the asbestos fibers and envelop these. The cement-asbestos layer or web is now pressed by a roller 10 on an endless belt 11, wound up in known manner on another roller, not shown, until it is sufficiently thick, is then removed and straightened so that it forms a plate. It is then left to harden while not pressed at all or only very slightly, whereby the diaphragm is obtained. It may be remarked that this process of making the plates is described merely by way of example. Every process can be used by which cement-asbestos plates having fibers placed parallel with the plane of the plate can be produced, as, for example, the process described in the United States Letters Patent to Hatschek, 769,078 dated August 30, 1904. The plates may not be pressed so severely, however, as is necessary when they are to be used as roofing tiles, because otherwise they lose much of their porosity. It may be further remarked that cement and asbestos have been employed heretofore for manufacturing diaphragms. These have, however, always been made by mixing cement and asbestos with water and placing the mixture into suitable molds which determine the final shape. In this manner no definite positioning of the asbestos fibers—parallel to the plane of the plate—could be obtained; on the contrary the fibers were placed irregularly in the cement and therefore gave the plate no ability to withstand breaking-strains. Such an ability can only be obtained, on the contrary, when the diaphragm is made with the aid of one of the known processes by which the asbestos fibers are positioned parallel with one another and with the plane of the plate, such as processes for manufacturing roofing tiles or plates which have already been proposed.

Comparative tests have shown that plates 10 mm. thick composed of 80 parts of cement and 20 parts of asbestos made on the pasteboard machine and hardened without pressure stood, in spite of an electrical resistance less by about 25%, more than twice the load before they broke than plates which were made by simply mixing cement and asbestos in the above proportions and filling the mixture into suitable molds. Obviously, the reason is that, in consequence of the horizontal position of the fibers and the attachment of the same occasioned thereby when made on the pasteboard machine, the plates are elastic and bend slightly without fracturing, whereas the plates made by simply mixing and casting the raw materials are brittle and when severely loaded fracture directly without bending. In comparison with plates of equal dimensions and made of cement and sodium chlorid they stand about 1½ times as much as those made of cement, sodium chlorid and hydro-chloric acid, i. e. almost twice the load. This possibility of greater load is exceedingly important in practice, however, because it admits of the plates themselves and the entire apparatus being made considerably larger than when the plates are weaker.

The asbestos-cement plates in question become considerably stronger when they are subjected to slight pressure after being shaped. It is true that this increase in strength is obtained at the cost of porosity, for which reason the pressure may only be slight if the electrical resistance is not to increase too much. On the other hand, such pressed plates can be made thinner and thereby the increase in electrical resistance can be wholly or partially equalized. An increase in porosity can be obtained in non-pressed and also in pressed plates by mixing with the cement before the plates are shaped such substances which can be removed by dissolving them out or in other manner after the plates have been hardened.

I claim:

1. A porous diaphragm, for the purposes of electrolysis, composed of an intimate mixture of cement and asbestos fibers said fibers being located parallel with the plane of the diaphragm.

2. The hereindescribed process of manufacturing porous diaphragms, for the purposes of electrolysis, which consists in mixing asbestos fibers with water, in removing said fibers from the water and applying cement to the fibers and simultaneously forming the fibers and cement into a plate having the asbestos fibers located therein parallel to the plane of the plate, and in allowing the plate to dry.

3. The hereindescribed process of manufacturing porous diaphragms, for the purposes of electrolysis, which consists in mixing asbestos fibers with water and simultaneously applying cement to the fibers and simultaneously forming the fibers and cement into plates having the asbestos fibers located therein parallel to the plane of the plate, and in finally pressing and hardening the plates.

In testimony whereof I have signed my name to this specification in the presence of two witnesses.

OTTO DIEFFENBACH.

Witnesses:
 JEAN GRUND,
 CARL GRUND.